(12) United States Patent
Burov et al.

(10) Patent No.: US 8,441,722 B2
(45) Date of Patent: May 14, 2013

(54) AMPLIFIER OPTICAL FIBER COMPRISING NANOPARTICLES AND PRODUCTION METHOD

(75) Inventors: Ekaterina Burov, Boulogne-Billancourt (FR); Alain Pastouret, Massy (FR); Laurent Gasca, Villebon sur Yvette (FR); Christine Collet, Mennecy (FR)

(73) Assignee: Draka Comteq, B.V. (NL)

( * ) Notice: Subject to any disclaimer, the term of this patent is extended or adjusted under 35 U.S.C. 154(b) by 548 days.

(21) Appl. No.: 12/369,860

(22) Filed: Feb. 12, 2009

(65) Prior Publication Data

US 2009/0207486 A1  Aug. 20, 2009

(30) Foreign Application Priority Data

Feb. 12, 2008 (FR) ..................................... 08 00742

(51) Int. Cl.
*H04B 10/17* (2006.01)
*G02B 6/02* (2006.01)

(52) U.S. Cl.
USPC ....................... 359/341.1; 359/341.5; 385/142

(58) Field of Classification Search ............... 359/341.1, 359/341.5; 385/142
See application file for complete search history.

(56) References Cited

U.S. PATENT DOCUMENTS

| | | | |
|---|---|---|---|
| 6,539,156 B1 * | 3/2003 | Dickson et al. | 385/129 |
| 6,849,334 B2 * | 2/2005 | Horne et al. | 428/402 |
| 7,039,264 B2 * | 5/2006 | Bryan et al. | 385/14 |
| 2003/0166297 A1 * | 9/2003 | Natan | 436/166 |
| 2003/0224214 A1 * | 12/2003 | Garito et al. | 428/694 ML |
| 2007/0109544 A1 * | 5/2007 | Chau et al. | 356/445 |
| 2007/0140638 A1 * | 6/2007 | Yang et al. | 385/132 |
| 2008/0128656 A1 * | 6/2008 | Thollon et al. | 252/373 |
| 2008/0154431 A1 * | 6/2008 | Defries et al. | 700/266 |
| 2009/0116798 A1 * | 5/2009 | Blanchandin et al. | 385/123 |

FOREIGN PATENT DOCUMENTS

| | | |
|---|---|---|
| EP | 1 304 774 A1 | 4/2003 |
| EP | 1 347 545 A | 9/2003 |
| EP | 1 764 350 A1 | 3/2007 |
| WO | 01/28946 A1 | 4/2001 |
| WO | 03/058776 A1 | 7/2003 |
| WO | 2007/020362 A2 | 2/2007 |

OTHER PUBLICATIONS

Lin et al. "Luminescence enhancement by Au nanoparticles in Er3+-doped germano-silicate optical fiber", Optics Express, vol. 15, No. 14, pp. 8603-8608 (published Jun. 25, 2007).*

* cited by examiner

*Primary Examiner* — Eric Bolda
(74) *Attorney, Agent, or Firm* — Shumaker, Loop & Kendrick, LLP

(57) ABSTRACT

An amplifier optical fiber comprising a central core of a dielectric matrix doped with at least one element ensuring the amplification of an optical signal transmitted in the fiber and a cladding surrounding the central core and suitable for confining the optical signal transmitted in the core. The fiber also comprises metallic nanostructures suitable for generating an electronic surface resonance in the dielectric matrix of central core, the wavelength of said electronic surface resonance corresponding to an excitation level of the element ensuring the amplification.

19 Claims, 3 Drawing Sheets

Fig. 3
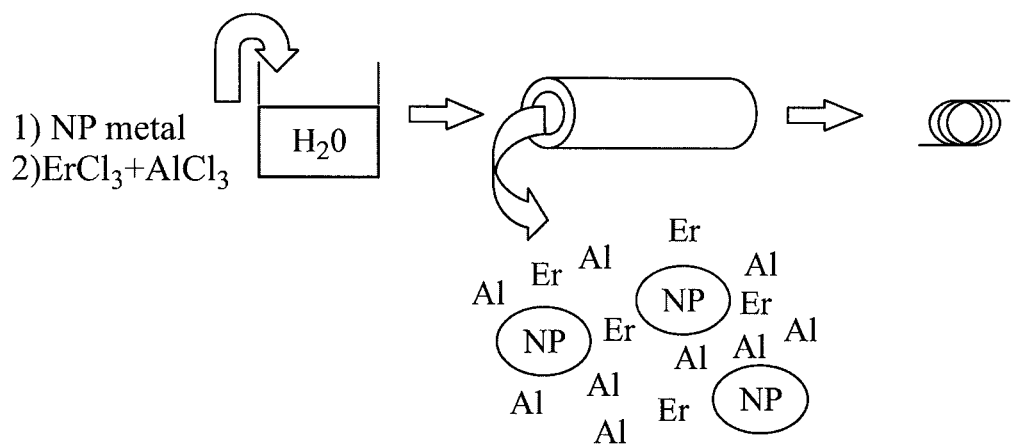
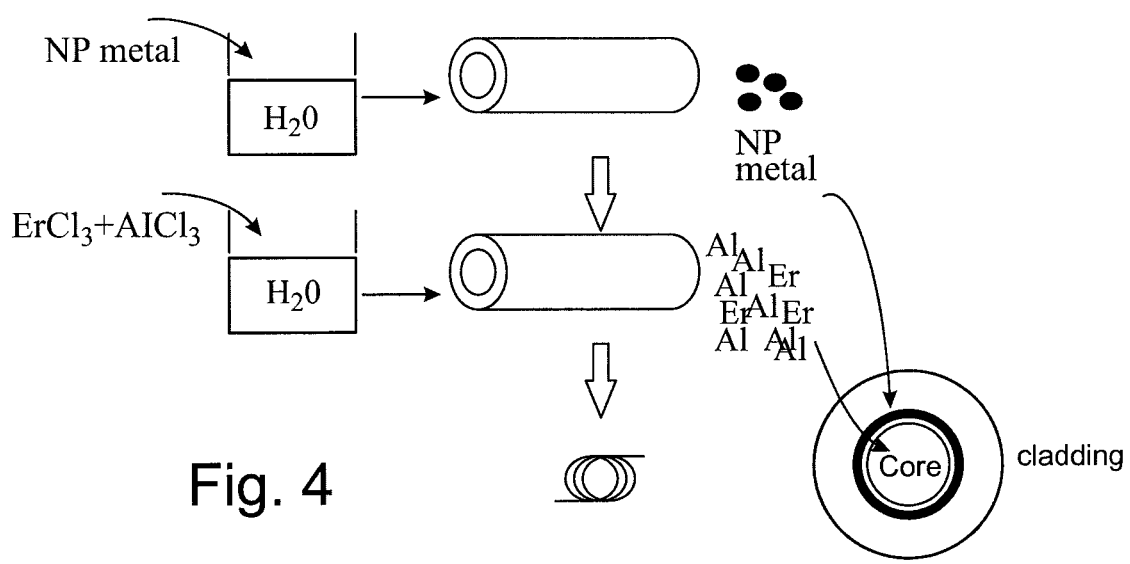
Fig. 4

1) NP Al/Er
2) metal

1) NP metal
2) Al/Er

AMPLIFIER OPTICAL FIBER COMPRISING NANOPARTICLES AND PRODUCTION METHOD

FIELD OF THE INVENTION

The present invention relates to the field of optical fibers, and more specifically, an amplifier optical fiber suitable for amplifying the optical signals transmitted. The amplifier fibers can be used in particular as high bandwidth transmission line amplifiers or as lasers. The invention also relates to a method for producing such a fiber.

BACKGROUND OF THE INVENTION

Amplifier fibers, and in particular fibers doped with rare earth elements such as erbium, are commonly used in long haul optical telecommunication systems in order to amplify transmitted optical signals. Such fibers are used in EDFAs (Erbium Doped Fiber Amplifiers) and have a central core composed of a silica matrix comprising Erbium doping elements optionally combined with complementary doping elements making it possible to improve the amplification.

In a manner known per se, optical amplification in an EDFA-type fiber operates by injecting into the fiber a pump signal which excites the ($Er^{3+}$) ions of the doping element. When a light signal passes through this portion of optical fiber, it deexcitates the ions by laser effect by producing a photon identical in all respects with the incident photon. The light signal has therefore been doubled. In the particular case of EDFA amplifiers, only two wavelengths exist which can be used for optical pumping, namely 980 nm and 1480 nm. The 980 nm wavelength is usually used for low-noise equipment but the corresponding absorption window is relatively narrow, thus stabilized laser sources which are complex and expensive must therefore be used. The absorption window of the 1480 nm wavelength is wider but requires the use of very powerful lasers which are expensive.

It has therefore been sought to use other wavelengths to pump amplifier fibers, and in particular shorter wavelengths. A known solution involves using an energy transfer between co-doping elements having a significant overlap area in their absorption and emission spectra. For example a transfer between ytterbium and erbium (Yb/Er) elements or a transfer between semi-conductor elements and erbium elements.

The energy transfer between ytterbium and erbium elements for widening the absorption window of the pumping wavelength has in particular been described in the publications "Coherent effect of $Er^{3+}$—$Yb^{3+}$ co-doping on enhanced photoluminescence properties of $Al_2O_3$ powders by sol-gel method" by X. J. Wang et al., Optical Materials 26 (2004) 253-259 and "Optical gain of single mode short Er/Yb doped fiber" by Q. Wang et al., Opt. Express 12, 6192-6197 (2004). This solution is however limited to relatively high pumping wavelengths.

The energy transfer between semi-conductor elements and erbium for reduced pumping wavelengths has in particular been described in the publications "Visible Wavelength Emission in the Silica Glass Fiber Doped with Silicon Nanoparticles" by Songbae Moon et al., ECOC 06. parer We3, P33, proceedings vol 3, p 187-188 and "Evidence of energy coupling between Si nanocrystals and $Er^{3+}$ in ion-implanted silica thin films" by C. E. Chryssou et al., Applied Physics Letters, Vol. 75, No. 14, 4 Oct. 1999. This solution is however limited by the problem of maintaining the semi-conductor element in the reduced state.

For the two solutions of the prior art described above, the effectiveness of the energy transfer to the erbium atoms is limited to the closest neighbours, i.e. a distance of a few nanometers between the active species.

A need therefore exists for an amplifier optical fiber which allows the use of a reduced pumping wavelength, in particular in the visible range in order to be able to use low-cost sources.

Moreover, the energy transfer between the power of the pump signal and the emission by the $Er^{3+}$ ions is limited to approximately 40%. It is therefore also sought to increase the signal amplification efficiency by increasing the intensity of the emissions by the rare earth ions, in particular by means of a longer range interaction between the ions involved in the transfer.

For this purpose, the invention proposes to exploit the phenomenon of electronic surface resonance, known as SPR or "Surface Plasmon Resonance", of metallic nanostructures arranged in the core or in the vicinity of the core of the fiber. A light signal injected into the fiber will cause a vibration of the electron cloud surrounding the nanostructures; the free electrons surrounding the nanostructures can then resonate with the dielectric matrix of the core of the fiber. When the resonance wavelength corresponds to an excitation level of the rare earth element ensuring the amplification, an energy transfer between the pump signal and the amplified emission is ensured.

The phenomenon of electronic surface resonance SPR has already been observed. For example, the publication "Optical Properties of Gold Nanorings" by J. Aizpurua et al. Physical Review Letters, Vol 90, No. 5. 7 Feb. 2003, describes the optical response of gold nanoparticles in the form of rings arranged in a glass matrix.

Moreover, the publications "Surface plasmon polariton modified emission of erbium in a metallodielectric grating" by J. Kalkman et al., Applied Physics Letters, Vol 83, No. 1, 7 Jul. 2003, "Coupling of Er ions to surface plasmons on Ag" by J. Kalkman et al., Applied Physics Letters, Vol 86, 2005, 041113-1-3, and "Plasmon-enhanced erbium luminescence" by H. Mertens et al., Applied Physics Letters, Vol 89, 2006, 211107-1-3, describe an increase in the light intensity emitted by the erbium ions arranged in proximity to silver nanoparticles. It is thus possible to limit the thermal effects in a planar guide.

The publication "Assessment of spectroscopic properties of erbium ions in a soda-lime silicate glass after silver-sodium exchange" by A. Chiasera et al., Optical Materials 27 (2005) 1743-1747, also describes the effects of silver nanoparticles on erbium ions. This publication indicates that it was possible to use an excitation wavelength from 360 nm to 750 nm and that it was possible to observe an increase in the light intensity emitted by the erbium ions. However, this solution is not directly transposable to an application with optical fibers due to the incompatibility between the melting point of silver and the production temperature of the optical fibers.

This electronic surface resonance SPR phenomenon has thus never been used to excite the erbium ions in an amplifier fiber. The production constraints of the optical fibers impose choices on the nature, size and shape of the incorporated nanostructures.

The optical fibers comprising nanoparticles are moreover known from the prior art. For example, the documents EP-A-1 347 545 or WO-A-2007/020362 describe optical fibers comprising nanoparticles in the core of the fiber. The nanoparticles described in these documents include a rare earth doping element and at least one element improving the amplification of the signal, such as aluminum, lanthanum, antimony, bismuth or other.

These documents do not however describe metallic nanoparticles making it possible to create an electronic surface resonance SPR phenomenon in the core of the fiber.

Metallic nanoparticles have been used for optical sensors. For example, the documents U.S. Pat. No. 6,608,716 and U.S. Pat. No. 7,123,359 describe optical sensors comprising a doped medium and a plurality of aggregated nanoparticles for forming a fractal structure. The doped medium is not however an amplifier medium doped with a rare earth element, but a medium doped with atoms of metal, semi-metal, and/or semi-conductor.

The document U.S. Pat. No. 6,807,323 describes an optical sensor using the phenomenon of electronic surface resonance SPR between a thin film conductor and a dielectric thin film doped with rare earth elements or transition metals. This document does not however describe metallic nanoparticles arranged in a dielectric matrix doped with at least one rare earth element.

Thus, no document of the prior art describes an optical fiber comprising a core doped with at least one rare earth element and also comprising metallic nanostructures making it possible to create an electronic surface resonance SPR phenomenon in the core of the fiber in order to allow the use of a reduced pumping wavelength and/or in order to increase the energy transfer between the pump and the amplification.

BRIEF SUMMARY OF THE INVENTION

The invention thus relates to an amplifier optical fiber comprising:
- a central core of a dielectric matrix doped with at least one element ensuring the amplification of an optical signal transmitted in the fiber,
- a cladding surrounding the central core and suitable for confining the optical signal transmitted in the core.
- metallic nanostructures suitable for generating electronic surface resonance in the dielectric matrix of the central core, the wavelength of said electronic surface resonance corresponding to an excitation level of the element ensuring the amplification.

According to the embodiments, the metallic nanostructures are arranged in the core of the fiber or in the cladding of the fiber, in the immediate vicinity of the core. An example of such a nanostructure is a nanoparticle.

According to the embodiments, the doping element of the core is a rare earth or a combination of rare earths; for example erbium. The dielectric matrix of the central core can be silica. The central core can also comprise a doping element for improving the signal amplification.

According to the embodiments, the metallic nanostructures include a metal chosen from rhodium (Rh), iridium (Ir), ruthenium (Ru), molybdenum (Mo), osmium (Os), platinum (Pt) or a combination thereof. The metallic nanostructures can also comprise an alloy containing gold (Au) or silver (Ag), The metallic nanostructures can have a diameter less than or equal to 100 nm, preferably less than or equal to 10 nm; they can have a melting point greater than or equal to 2200° C., and/or an evaporating temperature greater than or equal to 2200° C.

According to the embodiments, the metallic nanostructures are oval or ring-shaped; they can be constituted by grains of rare earth surrounded at least partially by a metal coating or they can be constituted by metal grains surrounded at least partially by a coating doped with rare earth atoms.

The invention also relates to a laser comprising at least one portion of optical fiber according to the invention; as well as an optical sensor comprising at least one portion of optical fiber according to the invention.

The invention also relates to a method for producing an amplifier optical fiber comprising a central core suitable for transmitting and amplifying an optical signal and a cladding surrounding the central core and suitable for confining the optical signal transmitted in the core, the method comprises the steps of:
- synthesizing metallic nanostructures by chemical or physical synthesis;
- dispersing the nanostructures in an aqueous solution;
- dissolving rare earth dopants in said solution;
- impregnating a silica rod by chemical vapour deposition (CVD) with said solution in order to form the core of an optical fiber preform;
- drawing the optical fiber by fiber drawing of the preform.

According to a variant, the invention relates to a method for producing an amplifier optical fiber comprising a central core suitable for transmitting and amplifying an optical signal and a cladding surrounding the central core and suitable for confining the signal transmitted in the core, the method comprises the steps of:
- synthesizing metallic nanostructures by chemical or physical synthesis;
- dispersing the nanostructures in a first aqueous solution;
- dissolving rare earth dopants in a second aqueous solution;
- impregnating a silica rod by chemical vapour deposition (CVD) with said first solution in order to form a portion of the cladding of an optical fiber preform;
- impregnating the silica rod by chemical vapour deposition (CVD) with said second solution in order to form the core of the preform;
- drawing the optical fiber by fiber drawing of the preform.

According to another variant, the invention relates to a method for producing an amplifier optical fiber comprising a central core suitable for transmitting and amplifying an optical signal and a cladding surrounding the central core and suitable for confining the optical signal transmitted in the core, the method comprises the steps of:
- synthesizing a powder of nanoscopic grains of rare earth by chemical or physical synthesis;
- depositing a metal coating on said grains in order to obtain metallic nanostructures;
- dispersing the nanostructures in an aqueous or alcoholic suspension;
- impregnating a silica rod by chemical vapour deposition (CVD) with said solution in order to form the core of an optical fiber preform;
- drawing the optical fiber by fiber drawing of the preform.

According to another variant, the invention relates to a method for producing an amplifier optical fiber comprising a central core suitable for transmitting and amplifying an optical signal and a cladding surrounding the central core and suitable for confining the optical signal transmitted in the core, the method comprises the steps of:
- synthesizing a powder of nanoscopic metallic grains by chemical or physical synthesis;
- depositing a coating of a layer doped with rare earth on said grains in order to obtain metallic nanostructures;
- dispersing the nanostructures in an aqueous or alcoholic suspension;
- impregnating a silica rod by chemical vapour deposition (CVD) with said solution in order to form the core of an optical fiber preform;
- drawing the optical fiber by fiber drawing of the preform.

The present invention further relates to an optical sensor, a laser and an optical fibre amplifier all comprising at least one portion of an amplifier optical fiber as disclosed above.

BRIEF DESCRIPTION OF THE DRAWINGS

Other characteristics and advantages of the invention will become apparent on reading the following description of the embodiments of the invention, given by way of example and with reference to the attached drawings, in which:

FIG. 3 schematically illustrates a first embodiment of an optical fiber according to the invention;

FIG. 4 schematically illustrates a second embodiment of an optical fiber according to the invention;

DETAILED DESCRIPTION OF THE INVENTION

The invention will be described below with reference to an amplifier fiber comprising a core doped with erbium (Er), of the type known as EDF (Erbium Doped Fiber). It is however understood that rare earth elements other than erbium (Er) can be used as dopants in order to ensure the amplification of an optical signal propagating in the fiber, such as for example ytterbium (Yb), thulium (Tm) or a combination thereof.

An optical fiber is in a standard fashion composed of an optical core, having the function of transmitting and optionally amplifying an optical signal, and an optical cladding, having the function of confining the optical signal in the core. For this purpose, the refractive indices of the core $n_c$ and of the cladding $n_g$ are such that $n_c > n_g$. In the case of an amplifier fiber, the core is typically composed of a silica matrix doped with rare earth atoms, such as erbium. Additional doping elements can be provided in order to improve the amplification of the signal by the rare earth element. For example, the addition of aluminium (Al) makes it possible to widen the absorption spectrum of the erbium. The documents EP-A-1 347 545 or WO-A-2007/020362 mentioned above describe such elements improving the amplification of the signal.

Figure 1:
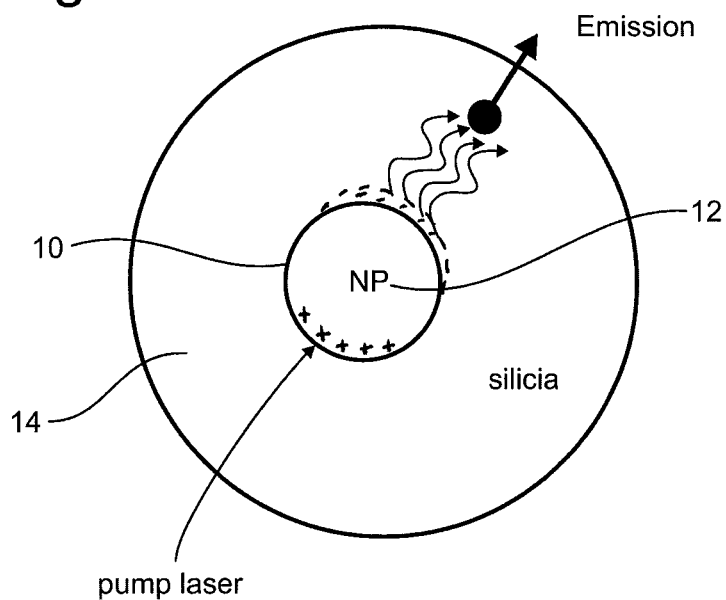
FIG. 1 schematically illustrates the principle of electronic surface resonance SPR for exciting an erbium ion.

Referring to FIG. 1, the core 10 of the fiber, made of silica doped with rare earth, is a light-transparent dielectric medium. The invention proposes adding metallic nanostructures 12 in the core or in the vicinity of the core of the fiber in order to generate an electronic surface resonance in the dielectric matrix of the central core. By immediate vicinity of the core it is meant the portion of cladding in contact with the core. By nanostructure it is meant an assembly of a few hundred to a few thousand atoms and/or molecules, leading to an object at least one of the dimensions of which is nanometric in size, between 1 and 100 nanometers and which possesses specific physico-chemical properties. The cladding 14 comprises silica and can therefore be classified as a dielectric medium.

The phenomenon of electronic surface resonance SPR is schematically illustrated in FIG. 1

The metallic nanostructures nanoparticles incorporated in the silica dielectric matrix are surrounded by a cloud of free electrons. When a pump signal is injected into the fiber, the electrons of the electron cloud surrounding the nanostructures can then resonate with the silica matrix. It is possible to choose the wavelength of the pump signal as well as the size, shape and nature of the metallic nanostructures such that the resonance wavelength corresponds to an excitation level of the erbium $Er^{3+}$ ions which will then emit photons when an optical signal passes through this portion of fiber. The light signal is thus amplified.

Figure 2:
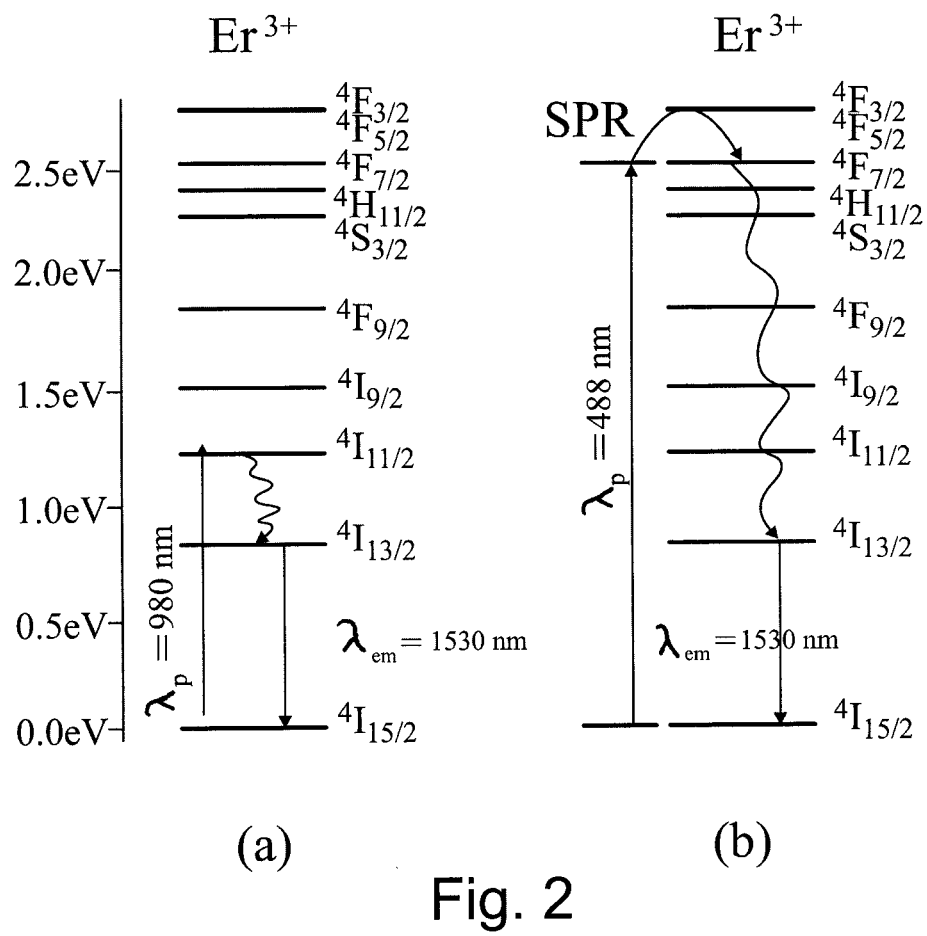
FIGS. 2a and 2b illustrate the energy levels of the erbium atoms.

FIG. 2a shows the excitation and emission of the $Er^{3+}$ ions as used in a standard EDF fiber. A laser pump emits in the fiber an excitation signal with a wavelength of 980 nm corresponding to an excitation level of the erbium ions; the $Er^{3+}$ ions by deexcitating emit a signal at 1530 nm amplifying the optical signal transmitted in the fiber. As indicated above, the 980 nm wavelength usually used requires a relatively expensive stabilized laser source. It is sought to use shorter excitation wavelengths, in particular in the visible range in order to be able to use simple diodes as the excitation source.

FIG. 2b shows the excitation and the emission of the $Er^{3+}$ ions in an optical fiber according to the invention. A wavelength of 488 nm can be used which causes resonance of the cloud of electrons surrounding the metallic nanostructures in the silica matrix. The resonance frequency corresponds to an excitation level of the erbium $Er^{3+}$ ions which can then, by deexcitating, emit a signal at 1530 nm amplifying the optical signal transmitted in the fiber. An amplifier effect is thus obtained in the optical fiber doped with a rare earth element by using a much shorter excitation wavelength—and therefore less expensive equipment—than in the prior art. Moreover, the effectiveness of excitation of the $Er^{3+}$ ions by the SPR effect is clearly higher than that obtained by a pump signal, the amplification efficiency is therefore higher than in the prior art.

The metallic nanostructures integrated into the core of the fiber are chosen according to their size, shape, nature and concentration, on the one hand so that the SPR effect is produced at a frequency corresponding to an excitation level of the rare earth ions used as amplification dopants, and on the other hand so as not to interfere with the transmission of the optical signal in the fiber. For example, introduction of metallic nanostructures into the core of the fiber modifies the viscosity and refractive index of the core and can lead to an increase in optical losses by diffusion. Moreover the metallic nanostructures integrated into the core or the vicinity of the core of the fiber must be compatible with the production constraints of the fibers, in particular the fiber-drawing temperatures.

For this purpose, metallic nanostructures comprising a metal chosen from rhodium (Rh), iridium (Ir), ruthenium (Ru), molybdenum (Mo), osmium (Os), platinum (Pt) or a combination thereof are highly suitable. Such nanostructures have a melting point greater than or equal to 2200° C. allowing fiber-drawing without altering the nanostructures, or at the very least an evaporating temperature greater than or equal to 2200° C., allowing fiber-drawing while preserving the nanostructures in the silica matrix of the fiber. The latter can liquefy during fiber-drawing but do not evaporate. The nanostructures used also have a good chemical stability to oxidation and a significant electron density, guaranteeing the presence of an electron cloud sufficiently significant for the phenomenon of electronic surface resonance to appear under the effect of a light signal. According to an embodiment, the metallic nanostructures can comprise an alloy made up of one of the metals cited above with gold (Au) or silver (Ag); the percentage by weight of gold or silver is small, less than 5% w/w in order not to lower the melting point beyond 2200OC. Such an alloy makes it possible to increase the SPR effects.

The choice of parameters (nature of the metal, geometry, number, distance relative to erbium) linked to the nanostructure is dictated by the desired excitation wavelength and the concentration of erbium, but also by the acceptable level of optical losses in the fiber depending on the envisaged uses. For example, for metallic nanostructures arranged in the core of the fiber and capable of generating resonance at a wavelength situated between 400 nm and 700 nm. The diameter of the metallic nanostructures is preferably comprised between 1 nm and 10 nm. In case the nanostructures have an oval shape, the aforementioned diameter refers to the maximum diameter of the oval shape.

The concentration of the metallic nanostructures must be chosen in order to ensure a sufficient energy level to be transferred to the erbium in order to obtain the sought electron resonance effect. According to the erbium concentration level, it can be substantially equal and up to a hundred times lower than that of erbium in order to limit the optical losses.

The shape of the metallic nanostructures can vary, according to their size, nature and the envisaged use; they can be substantially round or be oval or ring-shaped. An oval or ring shape makes it possible to increase the contact surface with the silica matrix and leads to an increase in the electron density around the nanostructures.

FIG. 3 illustrates a first embodiment of an optical fiber according to the invention in which metallic nanostructures are incorporated into the Aluminium/Erbium co-doped core of a fiber. An erbium-doped aluminosilicate fiber comprising metallic nanostructures is then obtained. In this embodiment, the electron resonance wavelength will depend on the electron charge density, i.e. on the metal used, and on the diameter of the metallic nanostructures.

The metallic nanostructures nanoparticles can be produced by chemical or physical synthesis and dispersed in an aqueous solution. The erbium and aluminium dopants are then mixed with this solution by dissolution of their chlorinated precursors. The chlorinated precursors and the nanoparticles are then incorporated by the impregnation of a porous silica rod during an MCVD operation in order to obtain a preform from which an optical fiber can be formed.

In a second embodiment, illustrated in FIG. 4, the metallic nanostructures nanoparticles can be introduced into the vicinity of the erbium-doped core, at the core-cladding interface, in the form of a ring doped with metallic nanostructures. This embodiment makes it possible to further limit the losses by absorption while ensuring a sufficient proximity between the erbium atoms and the metallic nanostructures in order to guarantee the energy transfer by SPR effect. The metallic nanostructures nanoparticles produced by chemical or physical synthesis are dispersed in an aqueous solution; and the erbium and aluminium dopants are dissolved in a separate solution. The doping elements (Al, Er) then the metallic nanostructures (NP) are then incorporated by impregnation of a porous silica rod during an MCVD operation in order to obtain a preform from which an optical fiber can be formed.

Figure 5:
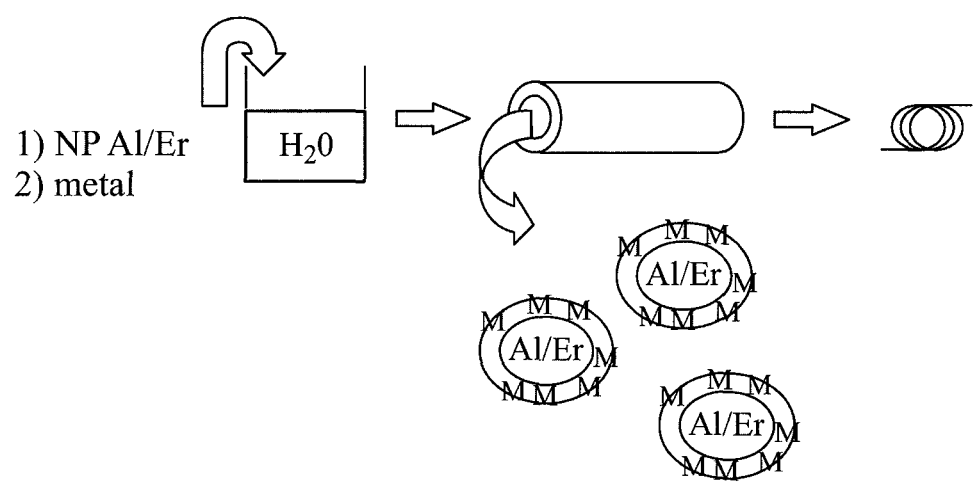
FIG. 5 schematically illustrates a third embodiment of an optical fiber according to the invention.

FIG. 5 illustrates a third embodiment of an optical fiber according to the invention in which nanostructures formed from an assembly of aluminium and erbium atoms are coated with a metallic layer. A fiber comprising Al/Er nanoparticles surrounded by a metallic coating is then obtained. In this embodiment, the electron resonance wavelength will depend on the electron charge density, i.e. on the metal used, the thickness of the metallic layer and the external diameter of the nanostructures. For example, in the publication of J. Aizpurua et al., Phys Rev Lett. vol 90 No. 5, 2003, cited above, it has been demonstrated for rings of gold with an external diameter of 60 nm that the resonance wavelength shifts from 700 nm towards 1400 nm when the thickness of the ring passes from 14 nm to 9 nm. Al/Er nanoparticles can be produced by chemical or physical synthesis leading to a powder of nanoscopic grains. The powder is then coated with a metallic layer by chemical or physical synthesis. The metal coating can cover all of the Al/Er nanoparticles or only a part. The particles thus coated form metallic nanostructures and are dispersed in an aqueous or alcoholic suspension and then incorporated by impregnation of a porous silica rod during an MCVD operation in order to obtain a preform from which an optical fiber can be formed.

Figure 6:
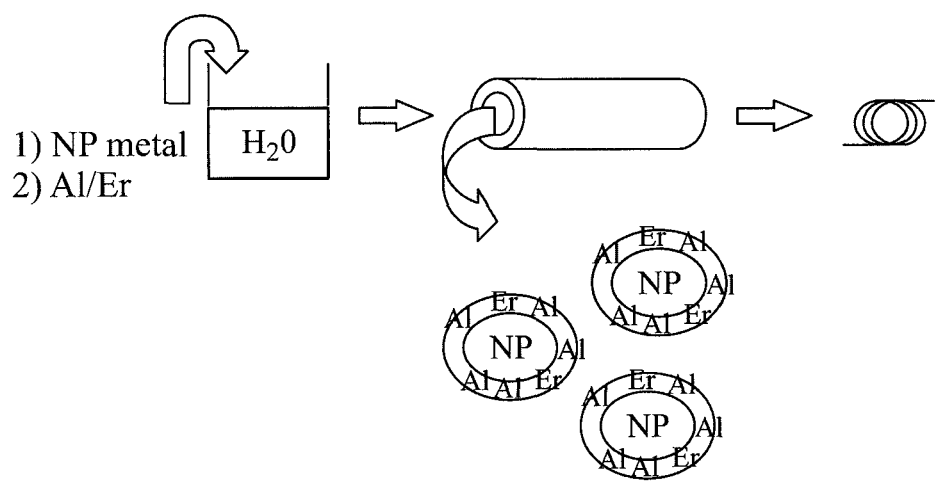
FIG. 6 schematically illustrates a fourth embodiment of an optical fiber according to the invention.

FIG. 6 illustrates a fourth embodiment of an optical fiber according to the invention in which metallic nanostructures are coated with an Aluminium/Erbium co-doped layer. A fiber comprising metallic nanostructures surrounded by a coating containing rare earth atoms is then obtained. The metallic nanostructures can be produced by chemical or physical synthesis leading to a powder of nanoscopic grains. The powder is then coated with an Al/Er co-doped layer by chemical or physical synthesis. The Al/Er coating can cover all of the metallic nanostructures or only a part. The particles thus coated are then dispersed in an aqueous or alcoholic suspension and incorporated by impregnation of a porous silica rod during an MCVD operation in order to obtain a preform from which an optical fiber can be formed.

An optical fiber is thus produced comprising a rare earth doped core allowing the amplification of an optical signal and comprising metallic nanostructures allowing an electron surface resonance SPR phenomenon to appear in order to excite the rare earth ions.

In the third and fourth embodiments (FIGS. 5 and 6), the proximity of the erbium ions to the metallic surface makes it possible to optimize the conditions for energy transfer between the excitation signal and the erbium emission, relative to the first and second embodiments (FIGS. 3 and 4). The embodiments of FIGS. 3 and 4 however allow a more precise control over the relative concentrations of erbium and metallic nanostructures.

Depending on the envisaged uses, it is possible to reduce the wavelength of the excitation signal and thus use less expensive equipment and/or it is possible to significantly increase the intensity of the emission of the rare earth ions in order to increase the signal amplification efficiency.

An optical fiber of this kind can be used as an amplifier, such as a standard EDFA but with a shorter excitation wavelength and a better efficiency. An optical fiber of this kind can also be used such as a fiber laser with an increased efficiency.

A fiber of this kind can also be used as an optical sensor for detection based on the SPR effect of molecules at low concentrations, for example for the detection of toxic gases or for the detection of substances at low concentrations for medical or biological uses.

Of course, the present invention is not limited to the embodiments or uses described by way of example. In particular, other amplifier doping elements can be used as a replacement for or in combination with the erbium.

The invention claimed is:
1. An amplifier optical fiber comprising:
a central core of a dielectric matrix doped with at least one element amplifying an optical signal transmitted in the fiber;
a cladding surrounding the central core confining the optical signal transmitted in the core; and
metallic nanostructures having an oval shape generating electronic surface resonance in the dielectric matrix of the central core, the metallic nanostructures arranged in proximity to the at least one element and effecting the amplification of the optical signal, the wavelength of said electronic surface resonance corresponding to an excitation level of the element ensuring the amplification.

2. The optical fiber of claim 1, in which the metallic nanostructures are arranged in the core of the fiber.

3. The optical fiber of claim 1, in which the metallic nanostructures are arranged in the cladding of the fiber, in the immediate vicinity of the core.

4. The optical fiber of claim 1, in which the doping element of the core is a rare earth or a combination of rare earths.

5. The optical fiber of claim 4, in which the rare earth element is erbium.

6. The optical fiber of claim 4, in which the central core further comprises a doping element for improving the amplification of the signal by the rare earth element.

7. The optical fiber of claim 1, in which the dielectric matrix of the central core is silica.

8. The optical fiber of claim 1, in which the metallic nanostructures comprise a metal chosen from rhodium (Rh), iridium (Ir), ruthenium (Ru), molybdenum (Mo), osmium (Os), platinum (Pt) or a combination thereof.

9. The optical fiber of claim 8, in which the metallic nanostructures include an alloy comprising gold (Au) or silver (Ag).

10. The optical fiber of claim 1, in which the metallic nanostructures have a diameter less than or equal to 10 nm.

11. The optical fiber of claim 1, in which the metallic nanostructures have a melting point greater than or equal to 2200° C.

12. The optical fiber of claim 1, in which the metallic nanostructures have an evaporating temperature greater than or equal to 2200° C.

13. The optical fiber of claim 1, in which the metallic nanostructures have a ring shape.

14. The optical fiber of claim 1, in which the metallic nanostructures are constituted by grains of rare earth surrounded at least partially by a metallic coating.

15. The optical fiber of claim 1, in which the metallic nanostructures are constituted by metallic grains surrounded at least partially by a coating doped with rare earth atoms.

16. The optical fiber of claim 1, wherein the optical fiber comprises at least a portion of at least one of a laser, an optical sensor, and an optical fiber amplifier.

17. An amplifier optical fiber comprising:
a central core of a dielectric matrix doped with erbium ions amplifying an optical signal transmitted in the fiber;
a cladding surrounding the central core confining the optical signal transmitted in the core; and
metallic nanostructures comprising gold and having an oval shape generating electronic surface resonance in the dielectric matrix of the central core, the metallic nanostructures arranged in proximity to the erbium ions to effect the amplification, the wavelength of the electronic surface resonance corresponding to an excitation level of the rare earth element ensuring the amplification.

18. The optical fiber of claim 17, wherein the metallic nanostructures are arranged in at least one of the core of the fiber and the cladding of the fiber in the immediate vicinity of the core.

19. The optical fiber of claim 17, wherein the metallic nanostructures further comprise rhodium (Rh).

* * * * *